Feb. 21, 1933.  W. L. VAN NESS  1,898,157
SHEET GLASS MANUFACTURE
Filed Dec. 9, 1929  2 Sheets-Sheet 1
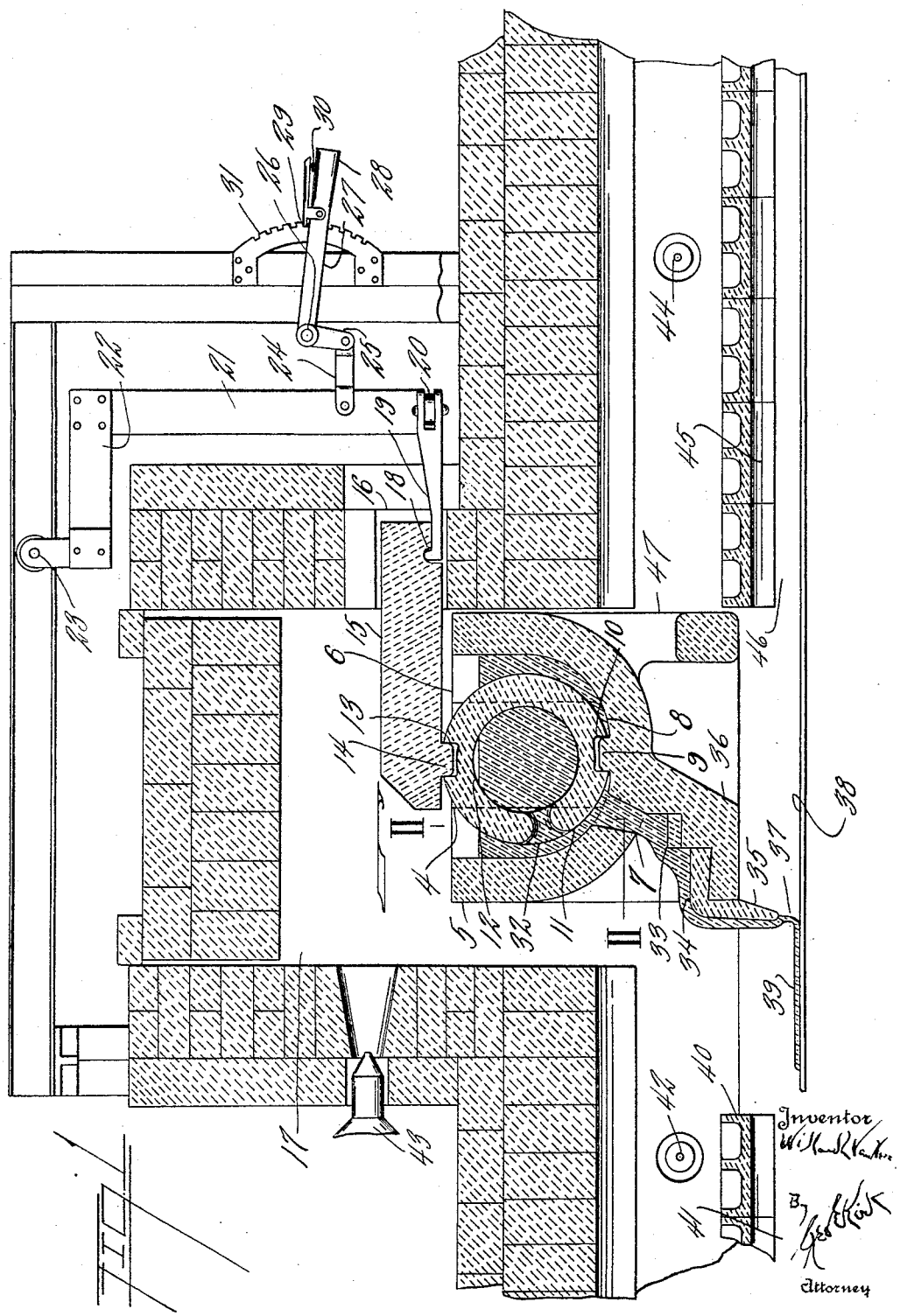

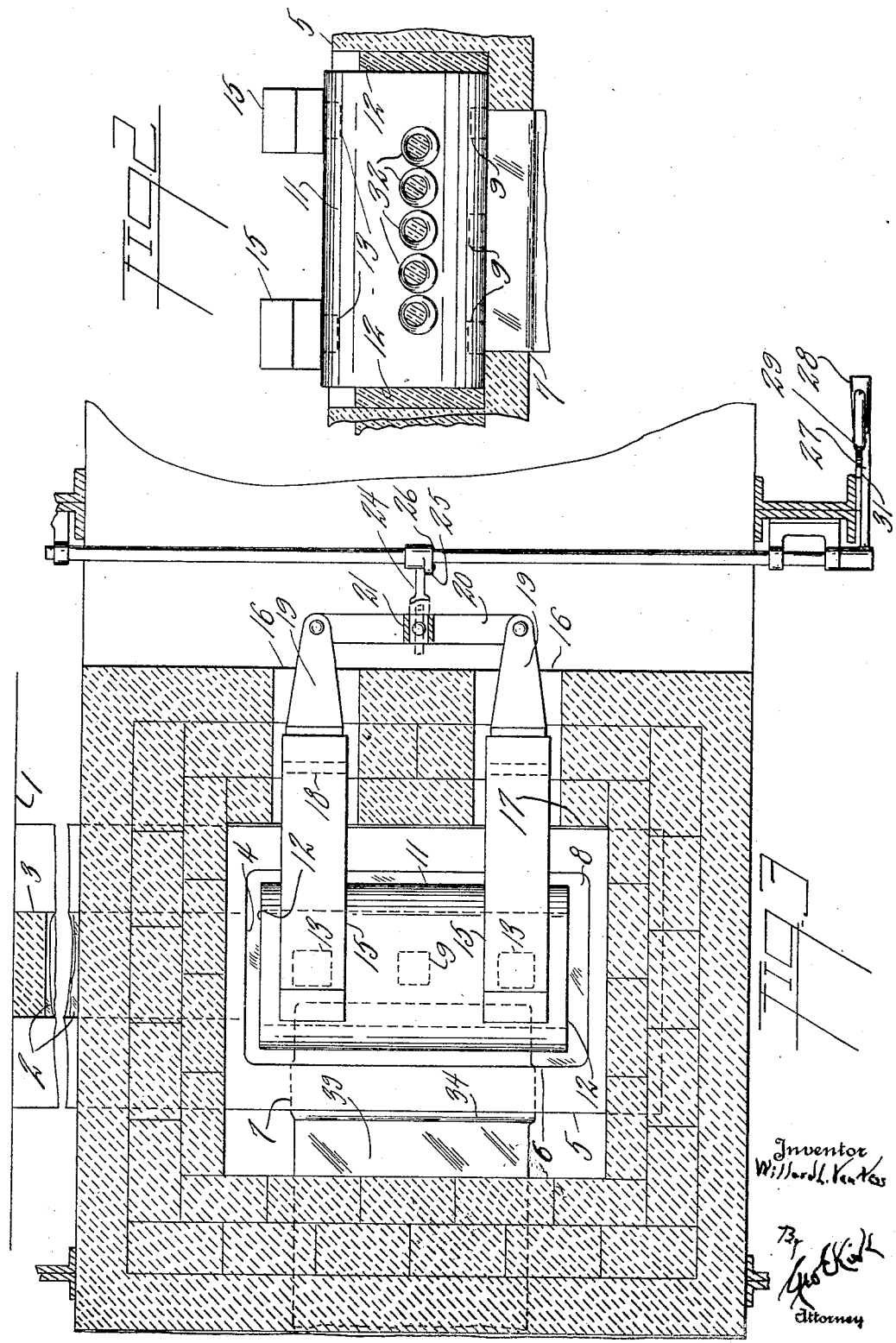

Patented Feb. 21, 1933

1,898,157

UNITED STATES PATENT OFFICE

WILLARD L. VAN NESS, OF TOLEDO, OHIO

SHEET GLASS MANUFACTURE

Application filed December 9, 1929. Serial No. 412,824.

This invention relates to flow control for liquid material.

This invention has utility when incorporated in molten glass delivery from a bulk source as in flow regulation for sheet glass production.

Referring to the drawings:

Fig. 1 is a fragmentary longitudinal section through an apparatus embodying the invention;

Fig. 2 is a section on the line II—II, Fig. 1, showing the rocker valve member in elevation; and Fig. 3 is a fragmentary plan view of the apparatus of Fig. 1.

Pool of molten glass 1 has way 2 therefrom which may be closed by gate 3. This way or spout 2 has terminal port 4 entering chamber or trough 5 having open top 6 and adjacent its bottom lineally extending port 7. Adjacent this port means 7, along bottom 8 of the trough 5, is a plurality of upstanding lugs 9 having slight clearance entrance into recesses 10 of tubular member 11 having open ends 12. This member 11 has its port 12 in approximate alignment with port 4 of the way 2. The member 11 on its upper side is provided with a pair of recesses 13 similar to the recesses 10. These recesses are engaged by lugs or projections 14 carried by arms 15 extending through ports 16 out of chamber 17 in which the trough 5 is located.

This pair of bars 15 as protruding from the housing for the chamber 17 has recesses 18 engaged by hooks 19 from equalizer bar 20 therebetween. This equalizer bar 20 is suspended by riser arm 21 having offset 22 to fulcrum 23 approximately over the bearing provided between the recess 18 and hook 19, thereby tending to minimize angular disturbance in the shifting of refractory arms 15 as effective in oscillating or rocking the member 11 as to the trough 5.

The riser 21 has link 24 engaging short arm 25 of angle lever having fulcrum 26. Fixed with this short arm 25 is long arm 27 of the angle lever 25, 27. This long arm 27 terminates in grip 28 with detent 29 normally thrown by spring 30 into engagement with segment 31 thereby determining a locking device for positioning the member 11 in the trough 5.

The flow of molten glass through the way 3 out of the port 4 into the trough 5 may not only be into the tubular portion of the member 11 through the terminal port 12, but laterally of such member to pass from the trough 5 by port means 7. However, from the interior of this tubular member 11 there may be major flow portion of the molten glass by plurality of ports 32 providing a lineal series of port means spaced upward from the port means 7, but as the member 11 is rocked in the trough 5, the port means 32 approaching the port means 7 are not in register and tend to restrict or cut off molten glass flow, while retraction of the refractory 15 and thereby thus rolling this highly refractory member 11 in the refractory trough 5 to the right in Fig. 1, provides additional clearance as to the left side of the trough 5 for greater volume of glass flow, distributed approximately uniformly in the lineal extent by the plurality of ports 32 and flowing as a single sheet through the port 7, there to be received upon ledge 33 (Fig. 1) and then ledge 34 having depending lip 35. These ledges 33, 34, in series are removably mounted upon refractory base 36 and are accordingly replaceable as they may be corroded by wear or there may be desirability for replacement in varying the control for the glass flow.

This depending lip 35 is shown as having clearance 37 above traveling platform or conveyor 38, upon which sheet 39 of the molten glass as continuously formed may be conducted away under arch 40 as a heat holding means in the entrance to lehr chamber 41 for properly lowering the temperature of the glass as may be desired.

In this region of the lehr or lehr entrance, temperature control may be had by adjustable burners 42, 43. In the travel of movable bed or conveyor 38 to molten sheet glass receiving position, burners 44 may be provided for bringing up the temperature of the conveyor, while lower arch 45 in the tunnel 46 may serve as supplemental holding means for the heat as desired for this bed, the additional heat from the tunnel 46 passing by port 47 into the region of the trough 5 to supplement the action of the other burners in maintaining a fluidity of the molten glass in this trough delivery device.

The rockable valve member having clearance as to the trough is one which may be readily replaced. However, as the temperature is maintained constant for glass fluidity, with clearance terminally and laterally as to the trough, the operation of this valve device may be definitely and accurately controlled for flow volume, and the flow in the cooling regions for the glass of the ledges may, as to such ledges be definitely determined by having such accurately dressed and, as being high grade flux liners, ground true after the burning thereof and laid on the faces for accuracy against any irregularities.

The molten glass as flowing over the ledges is of that initial degree of fluidity for free flowing and the proportion of the ports and the rate of flow, together with the temperature, as well as the progress rate for the conveyor 38 are such that as the flow comes to position of rest on the conveyor 38, it congeals to hold a form flat as to its upper surface against requirement of any grinding or fire finishing, with the sides or margin holding for the width at the uniform thickness. This side holding may be independent of providing a flange for molding width along the conveyor.

In this control of the flow as to stream volume, disclosed as effected through the rocking of the member 11, it is to be noted this member 11, as in the molten glass, is not operated in a manner to place tension or even compression strain on the refractory of the tubular member 11.

In the instance of high temperature refractory, this is a matter of material importance for maintenance of life of the member. Furthermore, the member is not subjected to excessive strain. Its mass is supported from below. The operating arms or bars 15 as lateral of the lugs 14 roll over the member 11 as riding thereon. It is to be noted these operating arms are accordingly independent of any lifting action for the member 11 and do not materially increase the loading of such member 11. Again, an important factor of delicacy and efficiency of the operation hereunder is that the supported member 11 in its operation has its rolling fulcrum below, and the maximum throw of the lever multiplying advantage is from the top side. This means that the arms 15 have a greater travel distance than the intermediate ports 32 for effecting the control so that the mechanical advantage is in the operating adjustment and one creating a minimum of internal stresses. The ledges are a factor in contributing to establishing the flat upper surface for the sheet 39.

What is claimed and it is desired to secure by Letters Patent is:

1. Apparatus for controllably delivering liquid comprising a conducting way for liquid from a major body to a minor body, means for maintaining fluidity of the liquid in the minor body, and tubular means for isolating one portion of the minor body as to another portion thereof in determining flow mass from the minor body.

2. Apparatus for controllably delivering molten glass comprising a way for the flow of glass from a major body to a minor body, means for maintaining a temperature for the glass fluidity in the minor body, and movable tubular means for isolating a portion of the minor body relatively to another portion of the minor body in determining flow from the minor body.

3. A flow off valve comprising a trough having a port extending lengthwise thereof, and a member rockable transversely of the trough on an axis at the bottom of the trough to vary member clearance as to the trough in proximity to the port.

4. A flow off valve comprising a trough having a port, and a hollow laterally ported member rockable transversely of the trough to vary member clearance as to the trough in proximity to the port.

5. Sheet glass apparatus embodying a trough having port means lineally thereof, and a member rollable in the trough on an axis at the bottom of the trough to vary member clearance as to the trough in proximity to the port means.

6. Sheet glass apparatus embodying a trough having port means lineally thereof, and a tubular member having port means lineally thereof, said member being shiftable in the trough to vary member clearance as to the trough in proximity to the port means.

7. Sheet glass apparatus embodying a trough having port means lineally thereof, a tubular member having port means lineally thereof, and control means for shifting the member as to the trough for increasing clearance between the port means of the trough and member in increase flow.

8. A flow-off valve comprising a receptacle having delivery means, a member rockable transversely of the receptacle on an axis at the bottom of the receptacle to vary member clearance as to the receptacle in proximity to the delivery means, and an actuator for the member independently of supporting the member.

9. A flow-off valve comprising a receptacle having delivery means, a control member supported to roll on the bottom of said receptacle to vary member clearance as to the receptacle in proximity to the delivery means.

10. A molten glass flow-off control comprising a receptacle having delivery means, a member rollably supported at its under side in said receptacle, and a reciprocable actuator for the member engaging the member remote from its support.

11. A molten glass flow-off control comprising a receptacle having delivery means, a member rollably supported at its under side in said receptacle, and a reciprocable actuator for the member freely movable over and interengaging with the member remote from its support.

12. A molten glass flow-off control comprising a receptacle having delivery means, a member rollably supported upon its underside in said receptacle, and a reciprocable actuator for the member freely movable over and interengaging with the member remote from its support, said actuator being more remote from the delivery means than the support for the member.

In witness whereof I affix my signature.

WILLARD L. VAN NESS.